(12) United States Patent
Coulon et al.

(10) Patent No.: US 12,269,179 B2
(45) Date of Patent: Apr. 8, 2025

(54) AUTONOMOUS MANIPULATION OF FLEXIBLE PRIMARY PACKAGING IN DIMENSIONALLY STABLE SECONDARY PACKAGING BY MEANS OF ROBOTS

(71) Applicant: BAYER AKTIENGESELLSCHAFT, Leverkusen (DE)

(72) Inventors: Carl-Helmut Coulon, Bonn (DE); Carsten Thomas, Dortmund (DE); Armin Schweiger, Bergisch Gladbach (DE); Daniel Felipe Ordoñez Apraez, Genoa (IT)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 473 days.

(21) Appl. No.: 17/849,257

(22) Filed: Jun. 24, 2022

(65) Prior Publication Data
US 2023/0009062 A1    Jan. 12, 2023

(30) Foreign Application Priority Data

Jun. 28, 2021    (EP) .................................... 21182082

(51) Int. Cl.
*B25J 9/16*    (2006.01)
*B25J 11/00*    (2006.01)
(Continued)

(52) U.S. Cl.
CPC ............. *B25J 9/1697* (2013.01); *B25J 9/161* (2013.01); *B25J 9/1664* (2013.01); *B25J 9/1682* (2013.01);
(Continued)

(58) Field of Classification Search
CPC ........ B25J 9/1697; B25J 9/161; B25J 9/1664; B25J 9/1682; B25J 11/005; B25J 13/085;
(Continued)

(56) References Cited

U.S. PATENT DOCUMENTS

2013/0125517 A1*    5/2013    Gomi .................. B65B 69/0033
                                                          53/381.1
2021/0046656 A1    2/2021    Prechtl et al.

FOREIGN PATENT DOCUMENTS

CN    111559551 A    8/2020
EP    2592007 A1    5/2013
(Continued)

OTHER PUBLICATIONS

Park, Hyun Soo et al., "3D Point Cloud Reduction using Mixed-integer Quadratic Programming" Proceedings of the IEEE Conference on Computer Vision and Pattern Recognition (CVPR) Workshops, 2013. (8 pages).

*Primary Examiner* — Adam R Mott
*Assistant Examiner* — Sagar Kc
(74) *Attorney, Agent, or Firm* — Harness, Dickey & Pierce, P.L.C.

(57) ABSTRACT

System for automatically manipulating primary packaging in secondary packaging, comprising a robot having at least one robot arm with a clamping gripper installed at a tool centre point, wherein each tool centre point has a force-torque sensor, an image recording module for recording images of at least the upper segment of the primary packaging, comprising at least two stereo cameras for recording 3-D images, and one or more processors for providing a three-dimensional point cloud, controlling the image recording module and controlling the robot on the basis of the analysis of the three-dimensional point cloud and the measurements from the force-torque sensors.

13 Claims, 5 Drawing Sheets

(51) Int. Cl.
*B25J 13/08* (2006.01)
*B25J 19/02* (2006.01)

(52) U.S. Cl.
CPC ............ *B25J 11/005* (2013.01); *B25J 13/085* (2013.01); *B25J 19/023* (2013.01)

(58) Field of Classification Search
CPC ...... B25J 19/023; B25J 9/1694; B25J 9/1612; G05B 2219/40571; G05B 2219/40575; G05B 2219/45048; G05B 2219/49041
See application file for complete search history.

(56) References Cited

FOREIGN PATENT DOCUMENTS

| | | | |
|---|---|---|---|
| EP | 2745999 | A1 | 6/2014 |
| WO | WO2011/161304 | A1 | 12/2011 |
| WO | WO2019/045779 | A1 | 3/2019 |
| WO | WO2019/169420 | A1 | 9/2019 |

\* cited by examiner

AUTONOMOUS MANIPULATION OF FLEXIBLE PRIMARY PACKAGING IN DIMENSIONALLY STABLE SECONDARY PACKAGING BY MEANS OF ROBOTS

This application claims the benefit of, and priority to, European Patent Application No. 21182082.4 filed on Jun. 28, 2021. The entire disclosure of the above application is incorporated herein by reference.

The application relates to a solution for automatically manipulating flexible primary packaging in dimensionally stable secondary packaging with the aid of a two-armed robot. In particular, the solution is intended to protect against contamination and the secondary packaging is intended to be resealable.

In the chemical-pharmaceutical industry, cardboard drums (dimensionally stable secondary packaging, also called fibre drums) with a PE inliner (flexible primary packaging, cf. plastic bags) for pulverulent and granular solids are a standard package for transporting and storing material. In this case, the material is situated in the sealed PE inliner which is in turn geometrically stabilized and protected by a cardboard drum. A metal tensioning ring is usually used to seal the drum. Cylindrical cardboard drums having a volume of 3 to 120 L are conventional.

The term "manipulation" in the sense of the application denotes the practice of changing the geometrical shape of the flexible primary packaging in the secondary packaging, for example opening the flexible primary packaging in order to sample, remove or load the contents, or closing it by twisting an upper section of the flexible primary packaging.

For opening flexible primary packaging, the starting state for the package is typically a sealed and possibly twisted upper section of the PE inliner (flexible primary packaging) in an open cardboard drum (dimensionally stable secondary packaging). The target state is an open PE inliner, with the result that material can be removed in any desired manner. The PE inliner is typically stressed during the packaging process, with the result that PE inliners which are manipulated (too) often have a changed and different physical behaviour. The challenge in this case is the automatic manipulation, in particular opening, of the flexible PE inliner in the open cardboard drum, a process which has hitherto been carried out manually.

Motivated by the reason for separating people and (active) materials which is based on the health and safety environment (HSE), it is absolutely necessary to automate the process.

On account of the large number of cardboard drums and flexible PE liners used as established packages in the industry, there was a need for a solution for manipulating, in particular autonomously opening, the PE inliners in this standard package by means of a robot. In addition, the solution should make it possible to autonomously unload and load as well as close the flexible primary packaging in the open dimensionally stable secondary packaging by means of a robot.

The object was achieved by means of a system and a method according to claims 1 and 11. The claims dependent thereon describe special embodiments of the solution according to the present disclosure.

The following description provides detail without distinguishing between the aspects of the present disclosure (method and system). The explanations that follow shall instead apply analogously to all aspects of the present disclosure, regardless of the context (method or system) in which they are given.

Flexible primary packaging in the sense of this application is typically a bag, for example a plastic bag, in particular a polyethylene bag, also called a PE inliner. Dimensionally stable secondary packaging in the sense of the application is typically a barrel or a drum, in particular a cardboard drum. However, the examples do not limit the applicability of the solution described.

In one particular embodiment, the term "manipulation" in the sense of the application denotes the practice of changing the geometrical shape of the PE inliner in the open secondary packaging in order to sample the contents, to use removal means or to load the contents, for example.

A first aspect of the application is a system for automatically manipulating flexible primary packaging in open dimensionally stable secondary packaging (also together called a package), comprising the following system modules:

A flexible force-controlled robot module for automatically and autonomously manipulating, in particular opening, the primary packaging. This robot module comprises a robot having at least one robot arm, preferably two robot arms, with a clamping gripper installed at a tool centre point of each arm. In order to carry out the opening, unloading and loading and closing processes, the clamping grippers are controlled taking into account the information from a force-torque sensor system of the robot arms. Each tool centre point has at least one force-torque sensor which can provide measurements of stresses, force and torque at the gripper;

An image recording module for recording images of at least the upper segment of the primary packaging, which image recording module comprises at least two stereo cameras for recording 3-D images of at least the upper segment of the primary packaging, wherein at least one of the stereo cameras is placed to the side of an air line between the package in an image recording region of the stereo cameras and the robot.

In one embodiment, a first camera records the package from above and the second camera is placed to the side, preferably at a right angle to an air line between the package and the robot, particularly preferably at an angle of 60 to 70 degrees in the vertical. In a further example, a third camera which is placed opposite the second camera is used.

The cameras are calibrated with respect to one another and with respect to the robot module (hand-eye calibration).

In one embodiment, images of the upper segment of the primary packaging and of the upper segment of the secondary packaging are recorded by the stereo cameras.

One or more processors (also called a control module for short) configured to control the system modules to carry out the following steps:
controlling the recording of images by the image recording module,
receiving the images from the image recording module,
processing images and providing a 3-D point cloud,
reconstructing the surface of at least the primary packaging and optionally of the secondary packaging from the three-dimensional point cloud;
calculating the highest point of the primary packaging from the 3-D point cloud as the gripping position of the clamping gripper from the surface reconstruction;

calculating a movement or a movement sequence of the clamping gripper to and at the gripping position, and forwarding the calculated movement or movement sequence to the robot module;

receiving the measurements from the force-torque sensors and detecting a twisting direction and/or stress of the primary packaging on the basis of the measurements;

wherein the primary packaging is opened by virtue of the gripper being pulled upwards counter to the twisting direction (in a derotating/unscrewing manner) in a movement or a rotational movement, taking into account measurements from the force-torque sensor at its tool centre point, until a predefined upper limit for the stress, measured by the force-torque sensor, is reached and/or predefined criteria for opening the primary packaging are achieved, alternatively wherein the primary packaging is closed by virtue of the gripper being moved in a twisting and optionally downward manner in a movement or a rotational movement, taking into account measurements from the force-torque sensor at its tool centre point, until a predefined upper limit for the stress, measured by the force-torque sensor, is reached and/or predefined criteria for closing the primary packaging are achieved;

Interfaces between the robot module and the processors and between the image recording module and the processors.

The surface reconstruction in the sense of the application is the computing of a surface-based and volume-based three-dimensional digital representation of the primary packaging and of the secondary packaging or parts thereof, produced with the aid of a program for processing n-dimensional point clouds and three-dimensional geometry.

In one embodiment, for better image recording and more reliable image recognition, additional areal illumination of the package, preferably from above, is used.

In one embodiment, the system comprises a module for placing the package within reach of the robot, below the first stereo camera and in the recording region of the second stereo camera.

In the context of the present disclosure, a robot module should be understood as meaning a device which is designed to physically interact with the environment in order to perform mechanical work. Each robot arm (also called a manipulator) of the robot module comprises, at the tool centre point, a gripping system, typically a clamping gripper, by way of which the primary packaging is gripped and manipulated. In principle, it is possible for the robot arm to be manually controlled. However, provision is preferably made for the movement of the robot arm to be force-controlled by input and/or programming.

In one embodiment, the robot arm has a plurality of movement axes so that the clamping gripper can approach the primary packaging from above with a maximum degree of freedom. It is advantageous to monitor the forces and/or torques acting on the movement axes since it is thus possible to distinguish where forces and/or torques act on the robot module.

As already stated, provision is made for the movement of the robot arm to be forced-controlled. In one embodiment, the force-torque sensor system comprises one or more force-torque sensors which can detect the twisting direction and stress of the primary packaging, transferred to the gripper, on the basis of the torque which occurs in 6 dimensions (degrees of freedom)—typically 3 translational and 3 rotational dimensions (Fx, Fy, Fz, Mx, My, Mz)—but without restricting the present disclosure to this embodiment.

A gripper in the closed state (also called a closed gripper) is moved taking into account the measurements from one or more force-torque sensors during the movement of the gripper. Before closing the gripper, no process-related forces and torques act on the gripper and therefore also on the force-torque sensor permanently coupled to the gripper. After closing the gripper and gripping the primary packaging, force coupling is close to the value 0. A force is produced in the longitudinal direction of the direction of movement only by the closed gripper being moved by means of the robot arm. The tensioning of the twisted primary packaging produces a torque since, as a result of the tensile force, the material is forced to derotate. Consequently, an opposite torque acts on the gripper. Instead of allowing the torque which results from the twisting to arise with an identically oriented gripper by pulling and the thus increasing force on the primary packaging, the process provides for avoiding the build-up of the torque. The torque which occurs is continuously minimized, preferably kept as close as possible to the value 0, by rotating the gripper about its own longitudinal axis counter to the measured torque direction. This rotation is typically carried out by moving the robot arm.

The force-torque sensors preferably measure continuously, at least while the gripper is closed.

The strength of the torque depends on various parameters. The most important parameters are: material properties of the primary packaging, size of the primary packaging, twisting of the primary packaging before manipulation, force when pulling the primary packaging.

A predefined upper limit for the stress of the primary packaging is therefore defined, in the sense of the application, by maximum measured values measured by the force-torque sensor.

The package must be placed within reach of the clamping grippers and in the recording region of the cameras. In one example, the robot module is fixed and the package is placed within reach of the clamping grippers. The secondary packaging is preferably rotatably mounted in this recording region. The robot can therefore have a better grip and the package may adapt to the forces if necessary, for example may assistively prevent the tearing of the primary packaging by reactively rotating the package.

It is preferred to provide uniform, areal illumination, typically from above. This can be achieved using an illumination device squarely above the robot and the drum in the form of LED light strips, as illustrated in FIG. 1, numeral 9, for example. An arrangement of LEDs is preferably used.

It is clear to a person skilled in the art that the choice and geometry of the illumination can be adapted as desired in order to achieve the most uniform possible illumination of the packages in the recording region.

In one embodiment, one or more processors are configured to control the system modules to calibrate the stereo cameras with respect to one another and with respect to the robot (so-called hand-eye calibration). This calibration is typically carried out once when starting up the system.

The system according to the present disclosure is distinguished by the fact that all hardware components used can be flexibly used and are not tools specifically adapted to the application.

A further aspect of the application is a method for automatically manipulating flexible primary packaging in open dimensionally stable secondary packaging, together called a package, by means of a computer-controlled robot having at least one arm with in each case a clamping gripper fixed at a tool centre point monitored by a force-torque sensor, having the following steps A) recording images of at least the upper segment of the primary packaging using at least two stereo cameras for recording 3-D images, wherein at least one of the stereo cameras is placed to the side of an air line between the package and the robot B) providing a three-dimensional point cloud of at least the upper segment of the primary packaging by analysing the recorded images;

C) determining a highest point of the primary packaging from the three-dimensional point cloud as a gripping point for one of the clamping grippers with the aid of a computer program for reconstructing the surface of at least the primary packaging and optionally of the secondary packaging from the three-dimensional point cloud;

D) calculating a collision-free approach path to the calculated gripping point with the aid of the computer program and transmitting the approach path to the robot in a calculated movement sequence;

E) moving the clamping gripper to the gripping point according to the calculated movement sequence, gripping the primary packaging at the gripping point, and moving the clamping gripper, wherein the primary packaging is opened by virtue of the clamping gripper being pulled upwards in a derotating or unscrewing manner in a movement or a rotational movement, taking into account measurements from the force-torque sensor at its tool centre point, until a predefined upper limit for the stress, measured by the force-torque sensor, is reached and/or predefined criteria for opening the primary packaging are achieved, alternatively wherein the primary packaging is closed by virtue of the clamping gripper being moved in a twisting and optionally downward manner in a movement or a rotational movement, taking into account measurements from the force-torque sensor at its tool centre point, until a predefined upper limit for the stress, measured by the force-torque sensor, is reached and/or predefined criteria for closing the primary packaging are achieved;

F) opening the gripper and optionally returning the clamping gripper to a starting position;

If the predefined criteria for opening the primary packaging or alternatively the predefined criteria for closing the primary packaging are not achieved, repeating steps A) to F) until said criteria are achieved.

A particular embodiment is a method for automatically manipulating flexible primary packaging (for example a bag) in open dimensionally stable secondary packaging, together called a package, by means of a computer-controlled robot having two arms with in each case a clamping gripper fixed at a tool centre point monitored by a force-torque sensor, wherein, in a first step, a three-dimensional point cloud (3-D point cloud) of at least the upper segment of the primary packaging is provided from the images recorded by at least two stereo cameras and a highest point of the primary packaging is determined from the 3-D point cloud as a gripping point for one of the clamping grippers of the robot with the aid of a computer program. In a further step, a movement for the clamping gripper to the calculated gripping point is calculated with the aid of the computer program and is transmitted to the robot. The clamping gripper moves, according to the calculated movement, to the gripping point, grips the primary packaging at the gripping point, and pulls the primary packaging upwards in a derotating or unscrewing manner in a movement or a rotational movement, taking into account information (measurements) from the force-torque sensor at the tool centre point of the moving clamping gripper.

If the clamping gripper moves upwards in a movement or a rotational movement, it preferably opens the primary packaging in the process such that it pulls the primary packaging to the side and opens it so that material can be removed from the primary packaging or inserted into the primary packaging using tools.

Such further steps and/or also steps for removing material from or filling material into the open primary packaging using a suitable tool can be configured in the control module.

In further steps, material can be unloaded from or loaded into the primary packaging.

In another calculated movement sequence, the clamping gripper can move downwards in a rotational movement and in the process can close the primary packaging such that, once twisted, it is pressed down in a closing movement in a helical manner. The end of the closing movement can be detected by an increase in the measured values from the force-torque sensor, in particular by reaching a predefined upper limit for the measurements from the force-torque sensor.

In one embodiment, after recording images of at least the upper segment of the primary packaging by means of the at least two stereo cameras in the image recording module and forwarding them to the one or more processors, the method according to the present disclosure comprises the following substeps:

a.i. Providing a 3-D point cloud of at least the upper segment of the primary packaging or of the package from a recorded image of the package;

a.ii. Preferably removing noise and/or reducing the number of points for simpler processing of the data. Such a reduction is typically effected by automatically removing points which are very close together. The reduction in the number of points reduces the necessary computing effort of the image processing system. In one example, in order to reduce the number of points, this number is reduced to a target value, for instance 50%, by eliminating the points which are closest together. This process is carried out until only the number of desired points from the starting number of points is reached. Such a reduction is described, for example, by Part et al. (http://www.cs.cmu.edu/—hyunsoop/cvpr13.pdf).

a.iii. Assigning points to the known geometries or elements, at least to the primary packaging, optionally to the secondary packaging, to the clamping gripper, to the robot arm and/or to the visible area of a material in the primary packaging. This also makes it possible to determine their position and size.

For this assignment, the positions of adjacent points in the 3-D point cloud are typically compared with one another and assigned to a respective geometry, also called clustered regions. These include, for example, the secondary packaging derived from the point cloud on the basis of the criterion "cylindrical geometrical body" or specifically defined interfering contours of moving (for example cable routing on the clamping gripper) or stationary (for example cameras, light strip square) contours.

All points which belong to the robot and to the clamping grippers may be computationally eliminated on the basis of the known position of the robot.

In one example, the points which are within an area assigned to the primary packaging and the points which are on a flat plane may be assigned as a visible area of the material. A material area can be calculated from these points.

a.iv. Selecting the points in the 3-D point cloud which is assigned to the primary packaging, possibly by subtracting the points which belong to the secondary packaging or the clamping gripper.

a.v. determining a highest point of the primary packaging from the three-dimensional point cloud as a gripping point for one of the clamping grippers.

In one embodiment, the method comprises the following substeps for calculating the movement of a clamping gripper:

b.i. Calculating a collision-free approach path for one of the clamping grippers. The clamping gripper preferably approaches from above. In one example, the definition of clustered regions from a.iii is taken into account for this calculation.

b.ii. Approach of the clamping gripper according to the approach path from b.i.

With respect to the movement of the robot arm, provision may be made for the robot arm and the clamping gripper to be in a defined starting position, also called a first position, at the start of the method according to the present disclosure. This first position is preferably defined in advance. The defined first position may likewise be determined when calibrating the system according to the present disclosure or the robot arm. If the clamping gripper releases the primary packaging, the robot arm can return to the defined first position.

In one embodiment, the robot independently calculates its approach path using dynamic path planning. Methods for calculating dynamic path planning are known from the prior art. For example, the software solutions from the ROS library for manipulators (ros.org) were used for the path planning.

In one example, for the path planning, it is specified that the clamping gripper grips the primary packaging vertically from above and approaches in a collision-free manner.

In one embodiment, the process of pulling up and derotating or unscrewing the primary packaging comprises the following steps:

c.i. Gripping the primary packaging at the highest point of the latter determined in a.v. from above and pulling it up until a predefined upper limit for the stress, measured by the force-torque sensor, is reached, while the twisting of the primary packaging, transferred to the gripper, is measured with the aid of the force-torque sensor and the gripper, in particular the wrist of the robot arm, is rotated counter to the measured twisting until or such that the force-torque sensor no longer detects any stress around the vertical axis (longitudinal axis);

c.ii. Releasing the primary packaging by opening the clamping gripper. The first robot arm is preferably moved to the side into the initial pose.

Substeps a.i to a.v and b.i to b.ii. are usually repeated until the primary packaging has been pulled up and derotated or unscrewed.

In one embodiment, the process of opening the primary packaging comprises the following steps:

d.i. Repeating steps a.i. to a.iv for the purpose of providing an up-to-date 3-D point cloud;

d.ii. Selecting a region of adjacent points in the 3-D point cloud which are assigned to the edge of the primary packaging, wherein this is carried out taking into account the height of the respective region and the orientation of a normal vector with respect to the points of the regions. If the normal vector is oriented horizontally, it can be derived from this that the area is vertical. In one example, step d.ii. is repeated until a region whose normal vector is not horizontal, that is to say still has to be opened, is found. In other words, a region in which the normal vector is not horizontal is selected for the next gripping operation.

d.iii. Gripping the selected region using the first clamping gripper and measuring a stress by means of the force-torque sensors;

d.iv. Moving the clamping gripper upwards and outwards, taking into account the measurements by the force-torque sensors, until the clamping gripper is directly above the edge of the secondary packaging and/or a predefined upper limit for the stress of the primary packaging, measured by the force-torque sensors, is reached.

In one example, the predefined upper limit for the stress depends on the tearing properties of the primary packaging. The predefined upper limit for the stress is typically determined using experiments. In addition, an overstress of the primary packaging can be prevented by rotatably placing the package. If the measured values of the forces from the force-torque sensors suddenly decrease, the drum has rotated or the primary packaging is torn.

d.v. Repeating steps b.i. to b.iv., preferably in alternation with the other arm, until the first camera provides an image in which it can be discerned that the primary packaging has been opened to a sufficient extent to be able to remove material from the packaging or to insert material into the packaging using tools. In one example, steps b.i. to b.iv. are repeated until it is discerned that the points assigned to the material form a sufficient visible area.

The two clamping grippers guided by the robot arms grip—if possible alternately—a gripping point, manipulate the latter and fix the primary packaging until the subsequent manipulation by the other arm. This makes it possible to prevent primary packaging which has not been fixed from collapsing.

In one embodiment, further method steps are dependent on the position of the highest point of the primary packaging determined in a.v.

In one embodiment, in an alternative to step a.v., the distribution of the highest point of the primary packaging with respect to the edge of the secondary packaging is determined. The distribution can be used to determine whether the primary packaging must be centred, that is largely derotated, and pulled up only via the secondary packaging or whether the process of opening the primary packaging can be directly started. The further this highest point lies in the centre of the package or the further the highest point of the primary packaging lies with respect to the edge of the secondary packaging above a predefined distance limit with respect to the edge of the secondary packaging, the more comprehensive the manipulation of the primary packaging in order to obtain open primary packaging, that is to say the greater the need for steps c.i to c.iii (derotating/unscrewing and pulling up).

In one embodiment, the edge of the secondary packaging (the drum edge), with minimum twisting of the primary packaging, is defined as a pulling target.

In one embodiment, in a last step, the primary packaging is stabilized in the previously reached position by means of an external holding device or the edge of the primary packaging is pulled down over the edge of the secondary packaging.

In one embodiment, these visible areas and/or the size of the required opening are predefined on the basis of the tool. In one example, the user can use a user interface to select the desired tool or this tool is stipulated in a protocol for removing material from or supplying material to the primary packaging by means of the robot or a further robot.

The method can be concluded if the material is visible when viewed from above and has a sufficiently large opening to be able to remove material using tools, for example suction lances or other sampling tools.

In further steps, the material is typically removed from the primary packaging or inserted into the primary packaging by means of the robot module or by means of another robot module.

The primary packaging can finally be closed by means of the robot module. For example, the flexible primary packaging in the open dimensionally stable secondary packaging can be automatically closed by the robot by virtue of the fact that:
the primary packaging is rotated in a first substep,
the primary packaging is pressed down in a second substep, with the result that the primary packaging is closed.

In another example, the movement of the clamping gripper results in the twisting of the primary packaging, and steps for sealing the primary packaging by means of a tie or a clip can be optionally carried out.

In one embodiment, the twisting of the primary packaging comprises the following steps:
Carrying out steps a.i. to a.iv. as described above.
a.v. Determining the highest point of the primary packaging;
a.vi. Calculating a collision-free approach path for one of the clamping grippers. The clamping gripper preferably approaches from above. The definition of clustered regions from a.iii is used for this calculation.
a.vi. Approaching the clamping gripper via the approach path from a.vi., gripping the primary packaging at the highest point of the latter determined in a.v. and rotating the primary packaging, while the stress on the clamping gripper is measured with the aid of the force-torque sensor and the clamping gripper is rotated in the direction of the measured twisting by means of the wrist of the robot arm until a predefined upper limit for the stress of the primary packaging, measured by the force-torque sensor, is reached or it is discerned that the points assigned to the material form an area having a determined size of zero or virtually zero.
a.vii. Releasing the primary packaging by opening the gripper.

In one embodiment, after the rotation, the method comprises steps for sealing the primary packaging by means of a tie or a clip before the primary packaging is pressed down.

In one embodiment, the primary packaging is rotated and pressed down at the same time in a.vi. The primary packaging can be hereby placed into the secondary packaging in a helical manner.

In one embodiment, the force-controlled robot module makes it possible to implement numerous safety functions, which makes it possible to use the system according to the present disclosure without mechanical protective devices. For example, the manipulator stops its movement if it determines a force of greater than a predefined value. This makes it possible to avoid danger to a user or an object as a result of a collision with the robot module. The force-controlled robot module preferably likewise comprises a speed monitoring system which ensures that the robot arm does not exceed a permissible predefined maximum speed.

The solution according to the present disclosure is advantageous for manipulating bulk material, in particular hazardous materials, or for manipulating the material in a sterile manner, in particular in the pharmaceuticals industry.

Some embodiments of the method according to the present disclosure and of the device according to the present disclosure are explained and described in more detail below on the basis of the accompanying drawings. Variations of these examples may become clear to a person of average skill in the art, such variations may possibly be used and the inventors intend the present disclosure to be practised in a manner other than specifically described herein. Accordingly, this disclosure comprises all modifications and equivalents of the subject matter stated in the enclosed claims, if permissible under current law. In addition, any combination of the elements described above in all possible variations thereof comprises the present disclosure, unless specified otherwise herein or clearly contradicted by the context.

The use of the terms "a" and "an" and "the" and similar references in connection with the description of the present disclosure (in particular in connection with the following claims) should be interpreted such that they cover both the singular and the plural, unless specified otherwise here or clearly contradicted by the context. The terms "comprising", "including", "having" and "containing" should be understood as open terms (that is to say "including but not restricted to"), unless specified otherwise.

DRAWINGS

The drawings described herein are for illustrative purposes only of selected embodiments and not all possible implementations, and are not intended to limit the scope of the present disclosure.

FIG. 1 shows schematic illustrations of the device for carrying out the method according to a preferred exemplary embodiment of the present disclosure FIG. 2 shows a flowchart of the method according to the present disclosure having the steps for opening the primary packaging with the control criterion of a lower limit for the size of the visible area FIG. 3 shows a flowchart of the method according to the present disclosure having the steps for opening the primary packaging with the control criterion "Is the clamping gripper directly above the edge of the secondary packaging?"

Figure 1:
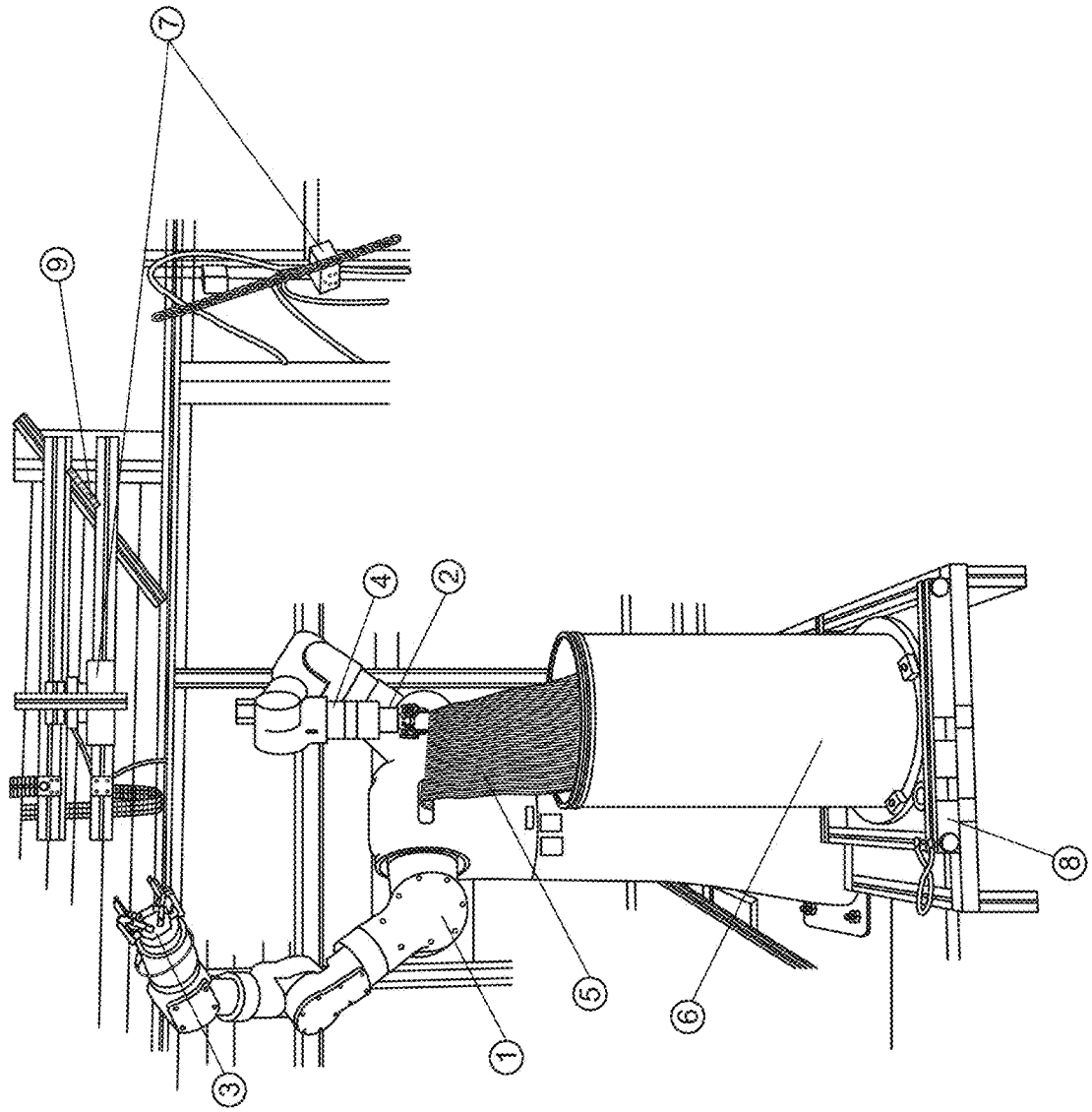

FIG. 1 shows, by way of example, a schematic illustration of the system according to the present disclosure and of its subcomponents from the side with the following definition of the reference signs:
1. Two-armed robot
2. Clamping gripper
3. Clamping gripper
4. Force-torque sensor
5. Primary packaging
6. Secondary packaging
7. Stereo camera systems
8. Secondary packaging recording (rotatable)

9. Illumination
10. Gripping point of the clamping gripper
30 Pixels assigned to the secondary packaging
21 Point cloud of the primary packaging
22 Calculated highest point of the primary packaging For example, a lightweight robot LBR iiwa from KUKA AG was used in the force-controlled robot module.

At least two stereo cameras were used to record a 3-D point cloud of the recording region. Each point in the cloud is located in terms of time and space (XYZ coordinates) and can then also be geo-referenced.

Figure 2:
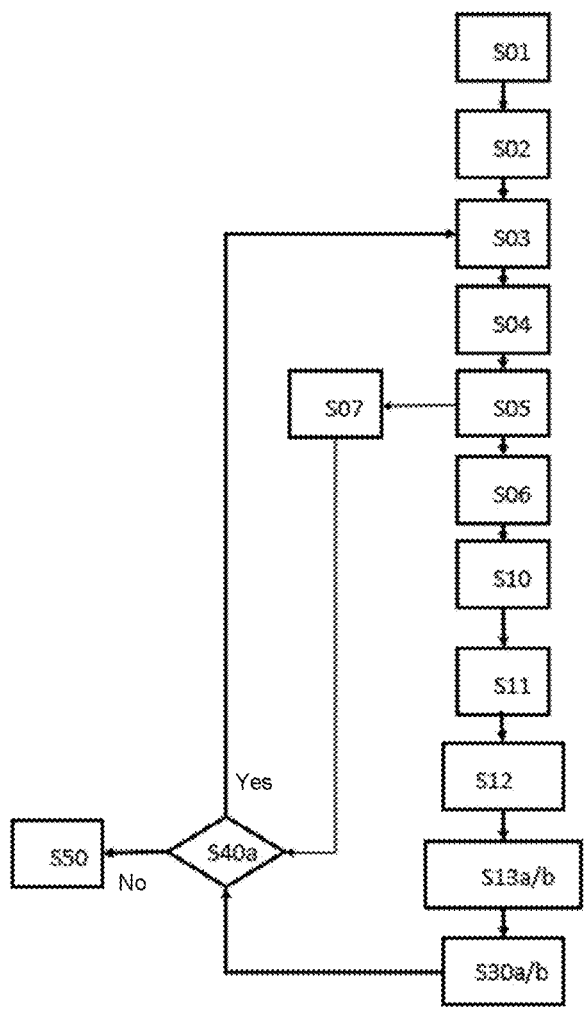
Figure 3:
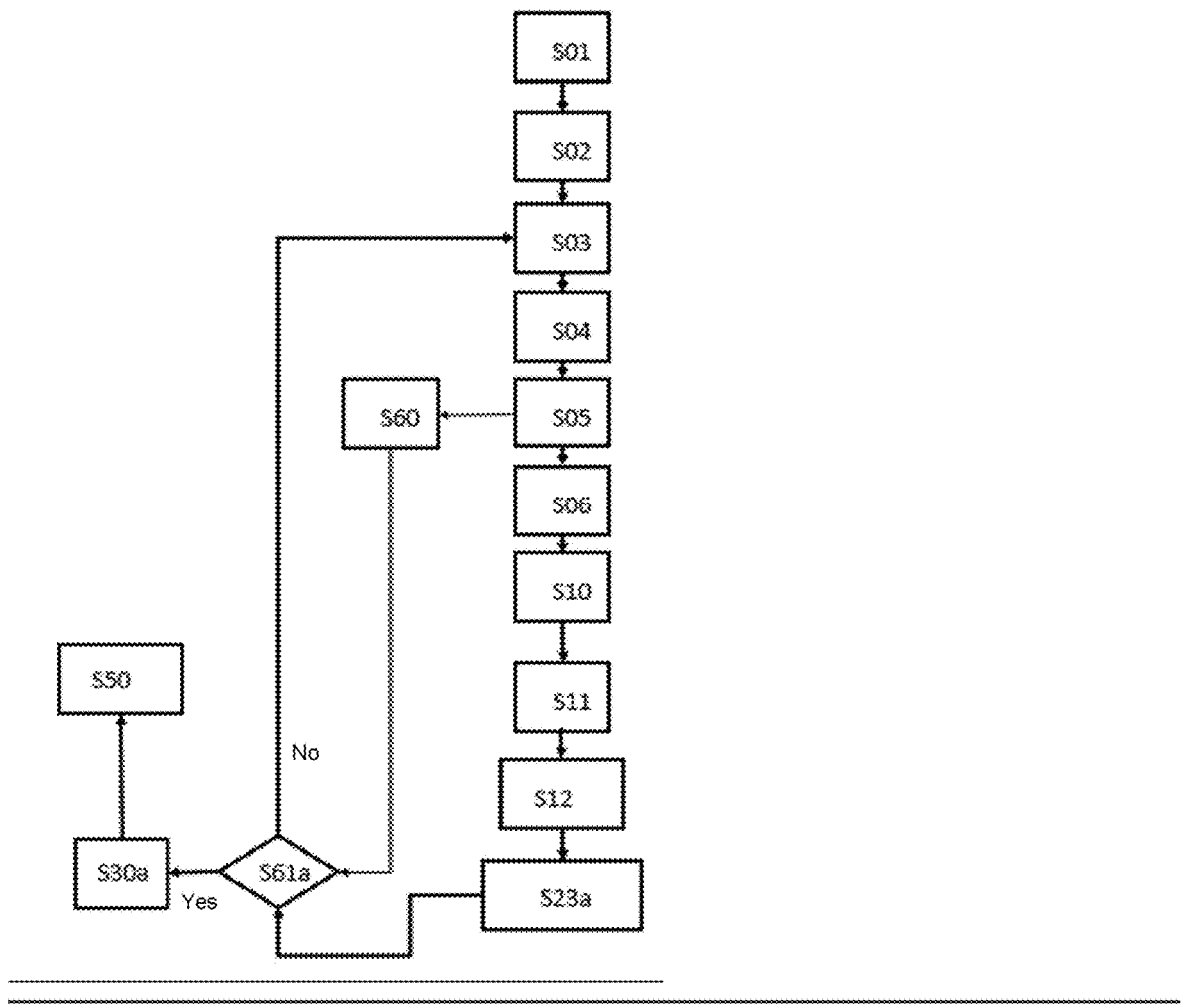

FIGS. 2 and 3 show a flowchart having the steps of the methods according to the present disclosure.

The steps of the methods are explained below with reference to the flowcharts.

S01 Position the packages with open secondary packaging in the recording region and stipulate the control criteria such as the upper limit for the stress of the primary packaging (upper limit for the force-torque sensor) and, for example, the lower limit for the size of the visible area S02 Robot in the initial position S03 Record a 3-D point cloud by means of the at least two stereo cameras S04 Remove noise and reduce the number of points for simpler processing of the data S05 Assign points to the known geometries—primary packaging, secondary packaging, clamping gripper and robot—for surface reconstruction with the aid of a computer program for processing n-dimensional point clouds and three-dimensional geometry.

S06 Select the points in the 3-D point cloud which are assigned to the primary packaging S07 Select the points in the 3-D point cloud which are assigned to the material and calculate the visible material area.

S10 Determine the highest point of the primary packaging with the aid of an algorithm.

S11 Calculate a collision-free approach path for the clamping gripper from the current position to the highest point of the primary packaging with the aid of an algorithm.

S12 Use a clamping gripper to grip the primary packaging at the highest point of the latter.

S13a—Open the primary packaging by pulling up the primary packaging using the clamping gripper with continuous measurements of the twisting and stress measured by the force-torque sensor and rotating the tool centre point of the robot arm counter to the measured twisting until the force-torque sensor no longer detects any twisting about the longitudinal axis and until the upper limit for the stress, measured by the force-torque sensor, is reached.

S13b—Close the primary packaging by rotating the tool centre point of the robot arm until the force-torque sensor reaches an upper limit for the twisting about the longitudinal axis and until the upper limit for the stress, measured by the force-torque sensor, is reached and optionally pressing the primary packaging down until an upper limit for a resistance is reached by the force-torque sensor.

S23a—Open the primary packaging by pulling up the primary packaging using the clamping gripper with continuous measurements of the stress, measured by the force-torque sensor, and rotating the tool centre point of the robot arm counter to the measured twisting until a predefined upper limit for the measurement is reached by the force-torque sensor.

S30a/b Release the primary packaging by opening the clamping gripper.

S40a The visible area≤lower limit of the visible area from S01.

Repeat S02 to S30a with the other arm until it is denied that the visible area≤lower limit of the visible area from S01.

S50 Stabilize the primary packaging in the open position.

S60 Define the edge of the secondary packaging.

S61a—Is the clamping gripper or the highest point of the primary packaging directly above the edge of the secondary packaging or is the clamping gripper or the highest point of the primary packaging at a distance of greater than or equal to a predefined distance limit from the edge of the secondary packaging?

Figure 4:
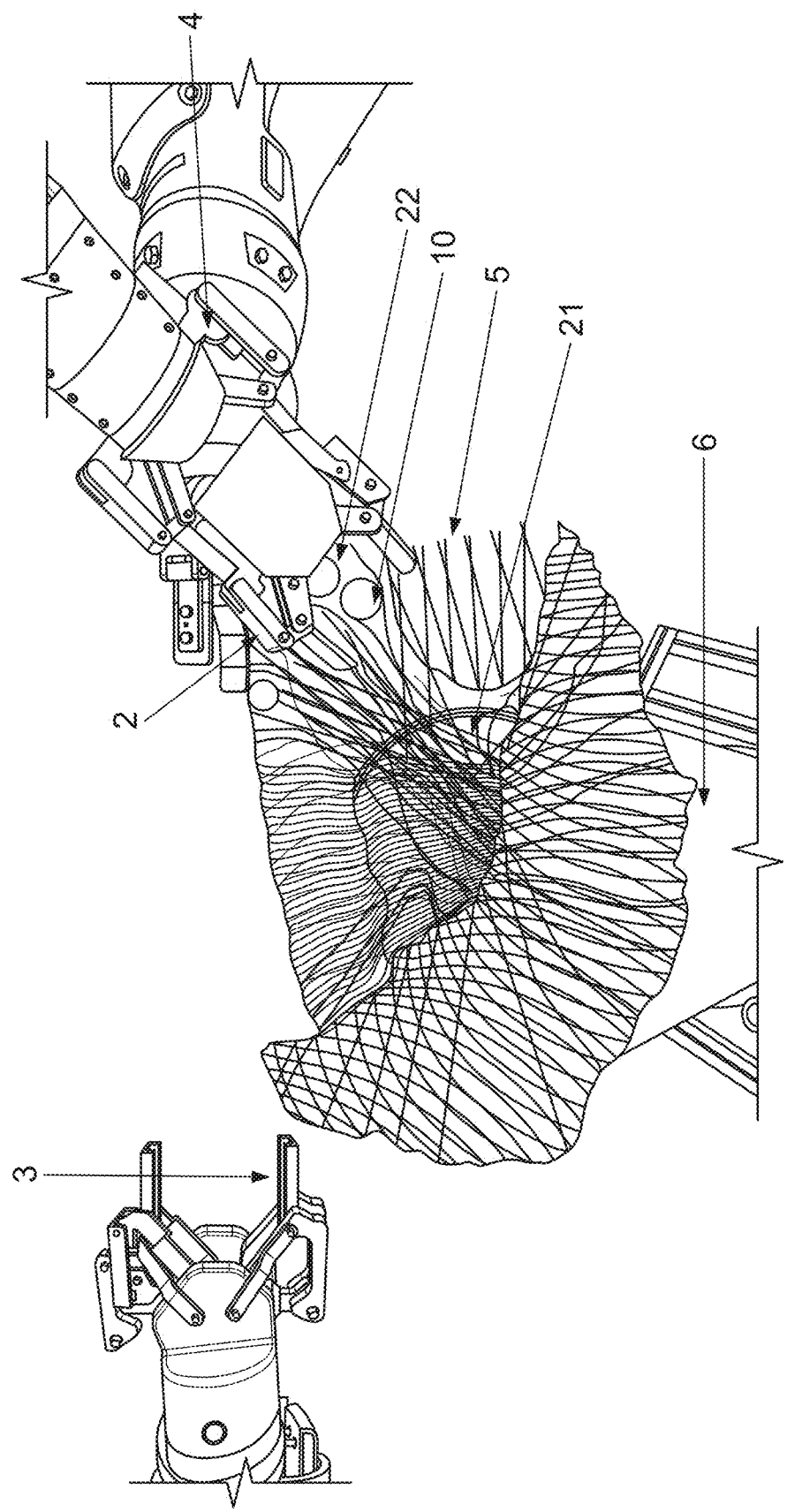
FIG. 4 shows an image of the system in which the 3-D point cloud is visualized with the aid of an out-of-core algorithm and is displayed using the primary packaging.

FIG. 4 shows an image of the system in which the 3-D point cloud is displayed using the primary packaging for the purpose of illustration. The gripping point (10) of the clamping gripper (3) approaches one of the calculated highest points of the primary packaging (22).

Figure 5:
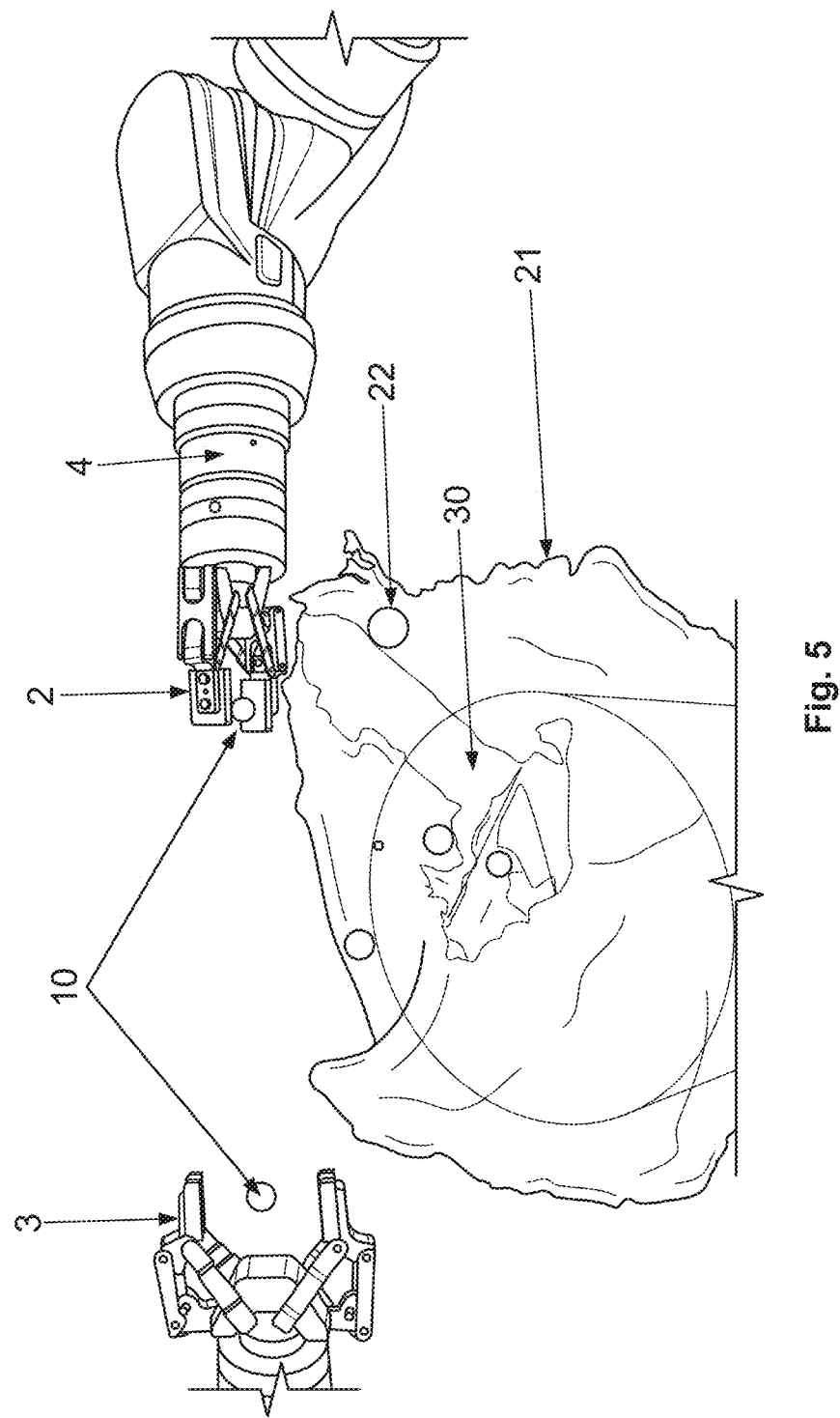
FIG. 5 shows the 3-D scan view of the device.

FIG. 5 shows a 3-D scan view of the device, in particular the pixels (30) assigned to the secondary packaging, the point cloud of the primary packaging (21) and the calculated highest points of the primary packaging (22). The clamping gripper (3) approaches one of the highest points from above.

That said, although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for automatically manipulating flexible primary packaging in open dimensionally stable secondary packaging, together called a package, the system comprising:
   a robot module comprising a robot having at least one robot arm with a clamping gripper installed at a tool center point of each robot arm, wherein each tool center point comprises a force-torque sensor which can provide at least measurements of the force and torque direction in degrees of freedom;
   an image recording module for recording images of at least an upper segment of the primary packaging, comprising at least two stereo cameras for recording 3-D images, wherein at least one of the stereo cameras is placed to a side of an air line between the package and the robot;
   one or more processors configured to control the robot module and the image recording module to carry out the following steps:
      recording images by means of the image recording module;
      processing images and providing a three-dimensional point cloud from the received images;
      reconstructing a surface of at least the primary packaging from the three-dimensional point cloud;
      calculating a highest point of the primary packaging from the surface reconstruction of the primary packaging as a gripping point for the clamping gripper;

calculating a movement sequence of the robot arm, comprising a collision-free approach path to the calculated gripping point for the clamping gripper;

forwarding the calculated movement sequence to the robot module;

receiving the measurements from the force-torque sensors; and gripping the primary packaging at the gripping point, and moving the gripper;

wherein, in response to moving the gripper:

the primary packaging is opened by virtue of the gripper being pulled upwards in an unscrewing manner in a movement or a rotational movement, taking into account measurements from the force-torque sensor at its tool center point, until a predefined upper limit for the stress of the primary packaging, measured by the force-torque sensor, is reached and/or predefined criteria for opening the primary packaging are achieved; or the primary packaging is closed by virtue of the gripper being moved in a twisting and/or downward manner, taking into account measurements from the force-torque sensor at its tool center point, until a predefined upper limit for the force-torque sensor is reached and/or predefined criteria for closing the primary packaging are achieved; and interfaces between the robot module and the one or more processors and between the image recording module and the one or more processors.

2. The system according to claim 1, wherein the second camera can record the package from above.

3. The system according to claim 1, wherein the robot is fixed.

4. The system according to claim 1, further comprising a module for placing the package within reach of the at least one robot arm and in the recording region of the at least two stereo cameras, wherein the package is rotatably mounted in the module for placing the package.

5. The system according to claim 1, wherein the force-torque sensors can detect the torques which arise in 6 dimensions, including three translational and three rotational dimensions.

6. A method for automatically manipulating flexible primary packaging in open dimensionally stable secondary packaging, together called a package, by means of a computer-controlled robot having at least one arm, wherein the at least one arm includes a clamping gripper fixed at a tool center point monitored by a force-torque sensor, the method comprising:

A) recording images of at least an upper segment of the primary packaging using at least two stereo cameras for recording 3-D images, wherein at least one of the stereo cameras is placed to a side of an air line between the package and the robot;

B) providing a three-dimensional point cloud of at least the upper segment of the primary packaging by analyzing the recorded images;

C) determining a highest point of the primary packaging from the three-dimensional point cloud as a gripping point for the clamping gripper with the aid of a computer program for reconstructing the surface of at least the primary packaging from the three-dimensional point cloud;

D) calculating a collision-free approach path to the gripping point with the aid of the computer program and transmitting the approach path to the robot in a calculated movement sequence;

E) moving the clamping gripper to the gripping point according to the calculated movement sequence, gripping the primary packaging at the gripping point, and further moving the clamping gripper;

wherein, in response to further moving the clamping gripper:

the primary packaging is opened by virtue of the clamping gripper being pulled upwards in an unscrewing manner in a movement or a rotational movement, taking into account measurements from the force-torque sensor at its tool center point, until a predefined upper limit for the stress of the primary packaging, measured by the force-torque sensor, is reached and/or predefined criteria for opening the primary packaging are achieved; or the primary packaging is closed by virtue of the clamping gripper being moved in a twisting and/or downward manner, taking into account measurements from the force-torque sensor at its tool center point, until a predefined upper limit, measured by the force-torque sensor, is reached and/or predefined criteria for closing the primary packaging are achieved; and F) opening the clamping gripper.

7. The method according to claim 6, wherein points in the three-dimensional point cloud are assigned to the primary packaging and to the secondary packaging.

8. The method according to claim 7, wherein, when performing step E), an edge of the secondary packaging is defined from the points in the three-dimensional point cloud which are assigned to the secondary packaging, and the primary packaging is pulled up and unscrewed in response to the highest point of the primary packaging being at a distance of greater than or equal to a predefined distance limit from the edge of the secondary packaging.

9. The method according to claim 6, wherein, when performing step E):

points in the three-dimensional point cloud are assigned to a visible surface of a material in the primary packaging;

the position and size of the visible material surface are determined; and the primary packaging is pulled up and unscrewed in response to the size of the visible material surface being sufficient to be removed from the primary packaging or to be inserted into the primary packaging with the aid of a predefined tool.

10. The method according to claim 6, wherein, in step E), the primary packaging is pulled up and unscrewed with the following substeps:

using the clamping gripper to grip the primary packaging at the determined highest point, pulling the primary packaging up until a predefined upper limit, measured by the force-torque sensors, is reached, while the twisting of the primary packaging, transferred to the gripper, is measured with the aid of the force-torque sensors, and the clamping gripper is rotated counter to the measured twisting, with the result that the force-torque sensors do not detect any rotation about the longitudinal axis.

11. The method of claim 6, further comprising returning the clamping gripper to a starting position.

12. The method of claim 6, further comprising, in response to the predefined criteria for opening the primary packaging or the predefined criteria for closing the primary packaging being not achieved, repeating steps A) to F) until said criteria are achieved.

13. The method according to claim 7, wherein points in the three-dimensional point cloud are further assigned to the clamping gripper.

* * * * *